United States Patent [19]

Dressler

[11] 4,417,247

[45] Nov. 22, 1983

[54] CIRCUITRY CONTROLLED BY CODED MANUAL SWITCHING FOR PRODUCING A CONTROL SIGNAL

[75] Inventor: Daryl D. Dressler, St. Paul, Minn.

[73] Assignee: Minnesota Mining and Manufacturing Company, St. Paul, Minn.

[21] Appl. No.: 316,233

[22] Filed: Oct. 29, 1981

[51] Int. Cl.[3] .......... H04Q 3/02

[52] U.S. Cl. .......... 340/825.31; 340/365 E; 328/75

[58] Field of Search .......... 340/825.02, 825.31, 340/825.56, 825.62, 825.68, 365 R, 365 S, 365 E; 307/141, 141.8; 328/75

[56] References Cited

U.S. PATENT DOCUMENTS

| | | | |
|---|---|---|---|
| 3,634,769 | 1/1972 | Sleater et al. | 328/75 |
| 3,754,164 | 8/1973 | Zorzy . | |
| 3,766,522 | 10/1973 | Marsh | 340/825.31 |
| 3,805,246 | 4/1974 | Colucci et al. | 340/825.31 |
| 3,831,065 | 8/1974 | Martin et al. | 340/825.31 |
| 4,083,424 | 4/1978 | von den Stemmen et al. | 180/114 |

*Primary Examiner*—Gerald L. Brigance
*Attorney, Agent, or Firm*—Donald M. Sell; James A. Smith; Robert L. Marben

[57] ABSTRACT

Circuitry controlled by a series of switch actuations per a preselected switch code provides a control signal. A plurality of flip-flop circuits are connected for series operation. A plurality of switches in excess of the number of digits in the code are available to provide an actuating signal for a flip-flop circuit. A time delay provided between successive flip-flop circuits enables a given switch to be used more than once for a switch code. Automatic resetting of the last flip-flop circuit at which the control signal is provided allows the control signal to be repeated one or more times before all of the flip-flop circuits are reset. A time delay circuit at the first flip-flop circuit provides for automatic reset of the circuitry. Each switch not connected to a flip-flop circuit as a digit of the switch code will, when actuated, reset the circuitry.

9 Claims, 1 Drawing Figure

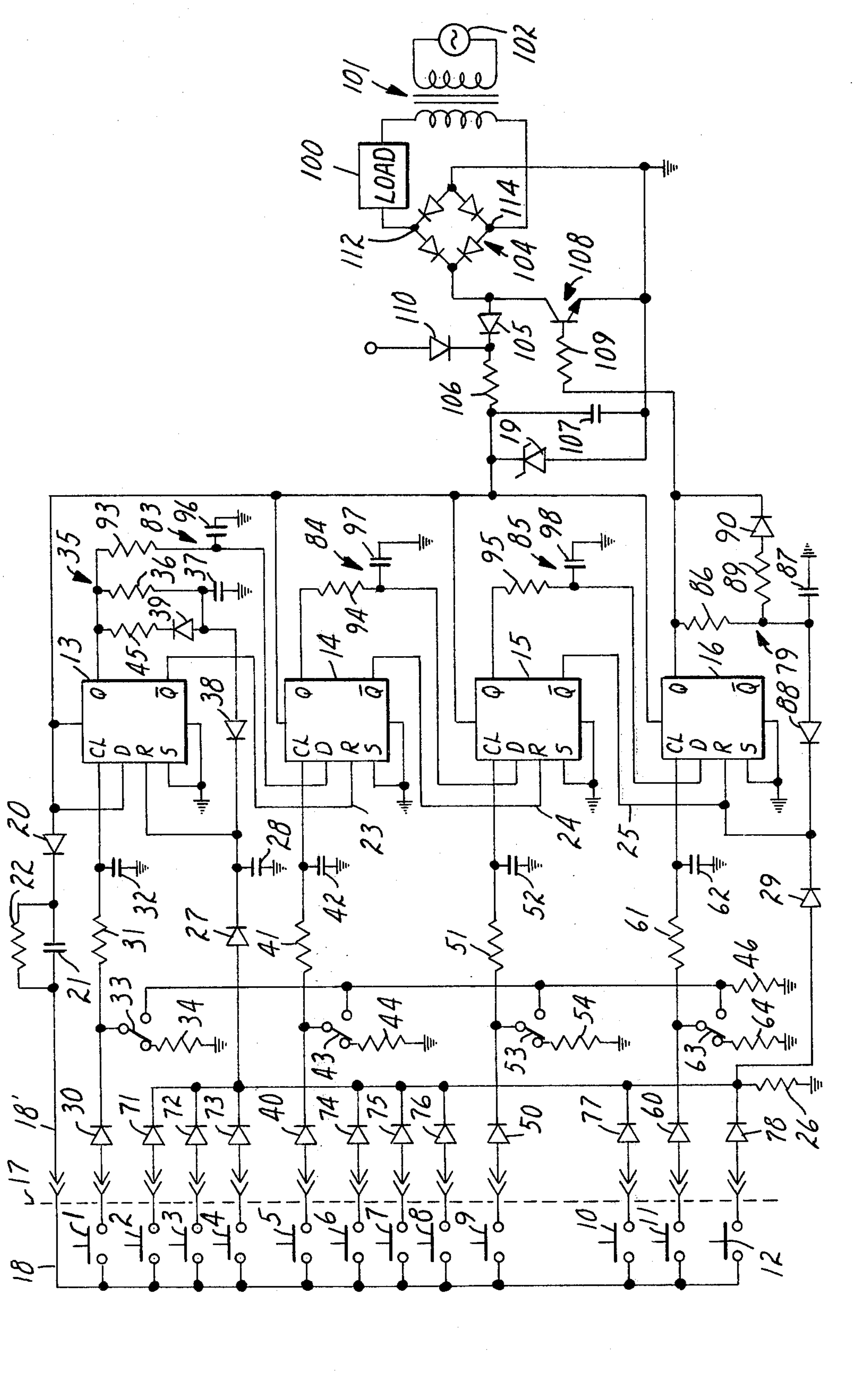
LOAD

CIRCUITRY CONTROLLED BY CODED MANUAL SWITCHING FOR PRODUCING A CONTROL SIGNAL

BACKGROUND

The invention presented herein relates to circuitry having a plurality of manually actuated switches for providing a control signal output in response to actuation of a preselected combination of the switches in a preselected sequence.

Various circuits have been devised having a plurality of manually actuated switches for providing a control signal output in response to the actuation of a preselected combination of the switches in a preselected sequence. Such circuits include the use of flip-flop circuit portions which are connected in series in such a manner that operation of the second and subsequent flip-flop circuit portions in the series is dependent on the operation of a preceding flip-flop circuit portion. Such operation is attained only by actuation of the preselected combination of switches in accordance with a preselected sequence. In such prior arrangements, wherein operation of a selected switch for the combination provides an input signal to a flip-flop, a selected switch can not be used more than once in the preselected combination. With such a limitation, the number of possible combinations of a plurality of switches is limited. It is desirable that the number of combinations available for selection from a plurality of switches be as large as possible to reduce the chances for an unauthorized user to arrive at the preselected combination of switches needed for operation of the circuitry. Further, not being able to use a switch twice in a preselected combination, precludes full use of letters of the alphabet assigned to the plurality of manually actuated switches since it is not possible to designate a preselected combination by a word or series of letters requiring the use of a letter more than once, such as in Bill, book, and loop, for example.

While various circuitry is known which employs coded manual switching for producing a control signal, the control signal can be repeated only by a second entry of the required coded switch actuations. This deficiency limits the use of such circuitry.

SUMMARY OF THE INVENTION

Use of a manually operable switch as a preselected switch more than once for a combination of switches selected from a plurality of manually operable switches for actuation in a preselected sequence for operating a plurality of series connected flip-flop circuits to provide a control signal is possible with circuitry according to the invention presented herein. The invention is embodied in circuitry having a plurality of flip-flop circuits corresponding in number to the number of entries or switch actuations required for operation of the circuitry with such flip-flop circuits connected for series operation and wherein a time delay is provided for delaying the application of an output from an operated flip-flop to an input of the next flip-flop in the series. Such an input is necessary for the operation of such next flip-flop when the preselected switch for such next flip-flop is actuated. With the time delay that is provided, a switch selected from the plurality manually operable switches to make up a preselected combination may be connected to provide an input signal to more than one of the flip-flop circuits as required by the combination since the time delay assures that a given actuation of such switch will only be effective to operate one of the flip-flops to which the switch is connected.

The invention presented herein also provides circuitry controlled by coded manual switching for producing a control signal which can be repeated in response to a further actuation of the last switch in the coded switch sequence. The circuitry provides for the automatic resetting of the last flip-flop circuit by use of the control signal provided at the output of such flip-flop circuit as a reset signal with such resetting delayed for a short time in comparison with the lapse of time before resetting of the other flip-flops and consistent with the duration desired for the control signal. Subsequent actuation of the switch connected for operation of the last flip-flop is then effective to cause the control signal to again be provided at the output of the last flip-flop. This arrangement is particularly useful in situations wherein a control signal must occur more than once within a short time.

Such features are provided along with a time delay initiated by the output of the first flip-flop of the series connected flip-flop which is effective to initiate resetting of the circuitry for subsequent entry of the coded switch actuations to again produce a control signal.

In addition, the circuitry of the invention presented herein is arranged so operation of any one of the switches that are not used for a selected code affects the resetting of the circuitry. This serves to enhance the integrity of the circuitry as it frustrates the effort of anyone who does not know the correct coded switching to actuate various switches in an attempt to arrive at the proper coded switching.

Use of the circuitry according to this invention contemplates the mounting of the plurality of manually operable switches one side of a barrier, such as a wall, where the switches are accessible to both authorized and unauthorized users with the actual connections made between the switches and the rest of the circuitry being made on the other side of the barrier which is not accessible to an unauthorized user. The circuitry according to the invention is arranged so that detection of the connections made of the switches by measurements made at the switch side of the barrier is difficult. This in part is due to the use of diodes which connect with each switch connecting position with each diode connected to ground via a resistive path of the same magnitude.

BRIEF DESCRIPTION OF THE DRAWINGS

The novel features and advantages of the invention presented herein will become more apparent to those skilled in the art upon consideration of the following detailed description which refers to the single figure of the drawing which is a circuit organization that is schematically set forth wherein the invention is carried into effect.

DETAILED DESCRIPTION

Referring to the drawing, circuitry is shown in a schematic form which includes a plurality of manually operable switches 1-12 and a plurality of flip-flip circuits 13-16. The number of flip-flop circuits required for the circuitry is determined by the number of switch actuations that are desired for a coded switching of switches 1-12 to be used for operation of the circuitry. As will be explained in greater detail, the flip-flop circuits are connected for series operation in that flip-flop 13 must be operated before flip-flop 14 can be operated with the operation of flip-flop 14 needed before operation of flip-flop 15 is possible. Similarly, the operation of flip-flop 16 is contingent upon the prior operation of flip-flop 15.

Commercially available "D" type flip-flop circuits can be used for the flip-flop circuits 13-16. Terminals provided by each of the flip-flop circuits 13-16, which will be referred to from time to time, are designated by the letter designations CL, D, R, S, Q, and $\bar{Q}$ (not Q). Operation of a "D" type flip-flop circuit is such that a logic signal applied to the D terminal will be transferred to the Q terminal when a logic 1 signal is applied to the CL terminal. The logic signal opposite to that presented at the Q terminal is presented at the not Q terminal. The flip-flop circuit is reset when a logic 1 signal is subsequently applied to the R terminal of the flip-flop.

Circuitry for applying a positive or logic 1 signal to the CL input of a flip-flop is the same for each of the flip-flop 13-16. Referring to flip-flop 13, the circuitry connected to the CL input terminal includes a diode 30 connected in series with a resistor 31 which has one end connected to the CL terminal with a capacitor 32 connected between ground and the CL terminal. The resistor 31 and capacitor 32 are provided to protect the flip-flop from static discharge damage. Diodes 40, 50, and 60 corresponding to diode 30 plus resistors 41, 51, and 61 corresponding to resistor 31 and capacitors 42, 52, and 62 corresponding to capacitor 32 are provided for similar connection to the CL input of flip-flop circuits 14, 15, and 16, respectively. Referring to the input circuitry for the CL terminal of flip-flop 13, the cathode of diode 30, which connects with the resistor 31, is connected to ground via a resistor 34, and a jumper 33. Similar jumpers 43, 53, and 63 are provided for diodes 40, 50, and 60, respectively, with resistors 44, 54, and 64 provided for connection with the jumpers 43, 53, and 63, respectively.

It is contemplated that the switches 1-12 will be mounted on one side of a barrier, such as a wall, with the remainder of the circuitry mounted on the opposite side of the barrier. The barrier is designated by the vertical dotted line 17 in the drawing. The switches are expected to be accessible to anyone with the remainder of the circuitry available only to an authorized user. One side of each of the switches 1-12 is connected to a common line 18 which passes through the barrier 17 and terminates at a connection to be used for connection to one side of the d.c. voltage provided for operation of the circuitry. The other side of each of the switches 1-12 are connected to separate connecting points on the other side of the barrier 17.

The circuitry shown in the drawing provides a d.c. voltage between the cathode of a Zener diode 19 and the ground which is used for operation of the flip-flop circuits 13-16. The cathode of Zener diode 19 is connected to each of the flip-flop circuits 13-16 and to the D terminal input of flip-flop circuit 13. The cathode of Zener diode 19 is also connected to a conductor 18' via a diode 20 connected in series with a parallel circuit formed by a capacitor 21 in a resistor 22. The conductor 18' terminates at a connecting point which is used to connect with conductor 18 to provide the d.c. voltage to one side of each of the switches 1-12.

It has been indicated that the flip-flop circuits 13-16 are connected for series operation. The series operation is accomplished in part by connecting the Q terminal of flip-flop 13 to the D terminal of flip-flop 14 which in turn has its Q terminal connected to the D terminal of flip-flop 15. Similarly, the Q terminal of 15 is connected to the D terminal of flip-flop 16. For purposes of explaining the series operation of the flip-flops 13-16 it will be assumed that the Q to D connections that have been mentioned are direct connections. For purposes of explanation, it will also be assumed that the switching code for operation of the circuitry is switches 2, 7, 9 and 11. With this code selection switch 2 is connected to the anode of diode 30, switch 7 to the anode of diode 40, switch 9 to the anode of diode 50 and switch 11 to the anode of diode 60. Operation of the circuitry requires that the switches 2, 7, 9 and 11 be operated in that order to cause the flip-flop circuits 13-16 to be operated in a series sequence to provide a control signal at the flip-flop 16. Upon operation of switch 2, a positive or logic 1 signal is applied to the CL terminal of flip-flop circuit 13 which causes the positive signal present at the D terminal to be transferred to the Q terminal. The logic 1 signal that is present at the Q terminal at flip-flop 13 is transferred to the D terminal of flip-flop 14. Upon receiving a logic 1 signal by operation of switch 7, flip-flop 14 operates to cause the Q output of flip-flop 14 to present a logic 1. The logic 1 presented at Q terminal of flip-flop 14 is transferred to the D terminal of flip-flop 15. The flip-flop 15 upon receiving a logic 1 at its terminal CL, due to actuation switch 9, causes the Q terminal of flip-flop 15 to present a logic 1 which is applied to the D terminal of flip-flop 16. Upon actuation of switch 11 to provide a logic 1 to the CL terminal of flip-flop 16, the logic 1 presented at the D terminal is transferred to the Q terminal of flip-flop 16. Accordingly, flip-flop 14 can not respond to actuation of switch 7 to present a logic 1 at its Q terminal until it has first received a logic 1 from flip-flop 13. Similarly, operation of flip-flop 15 in response to actuation of switch 9 to provide a logic 1 at its Q terminal is dependent on the prior application of the logic 1 to its D terminal from flip-flop 14. Likewise, the operation of flip-flop 16 in response to the actuation of switch 11 is dependent on the prior operation of flip-flop 15.

In order that the operation that has just been described can be repeated, it is necessary that the flip-flop circuits 13-16 be reset. The application of a logic 1 to the R terminal of the flip-flop circuits 13-16 is effective to reset the flip-flops. In the circuitry shown the resetting is accomplished in series in that flip-flop 14 is not reset until flip-flop 13 has been reset with 15 reset following the resetting of flip-flop 14 and flip-flop 16 being reset after flip-flop 15 has been reset. When flip-flop 13 is reset, a logic 1 is provided at its not Q terminal. This resetting action is made possible by having the not Q terminal of flip-flop 13 connected directly to the R terminal of flip-flop 14 by a conductor 23. Similarly, the not Q terminal of flip-flop 14 is connected directly to the reset terminal R of flip-flop 15 via a conductor 24. A conductor 25 is used to connect the not Q terminal of flip-flop 15 to the reset terminal R of flip-flop 16.

The logic 1 signal required to reset the flip-flop 13 is obtained from the Q terminal of flip-flop 13 and is applied to the reset terminal R of flip-flop 13 via a delay circuit indicated generally at 35. The delay circuit 35 is provided by a resistor 36 which has one end connected to the Q terminal of flip-flop 13 with its other end connected to ground via a capacitor 37. A diode 38, which has its anode connected to the connection common to the capacitor 37 and resistor 36, has its cathode connected to the reset terminal R from flip-flop 13 to connect the delay circuit 35 to the reset terminal R of flip-flop 13. The time delay provided by the time delay circuit 35 is thus initiated when flip-flop 13 is triggered by a logic 1 signal applied to its CL terminal to cause its terminal Q to present a logic 1. The time delay provided by time delay circuit 35 must be at least long enough to allow for the entry of the required switch actuations corresponding to the desired code. When the voltage on capacitor 37 reaches a level sufficient to reset the flip-flop 13, the flip-flop 13 is reset to cause the not Q terminal to present a logic 1. The logic 1 presented at the not Q terminal of flip-flop 13 is applied directly to the reset terminal R of flip-flop 14 causing it to be reset. Resetting flip-flop 14 causes its not Q terminal to present a logic 1 which is provided directly to the reset terminal R of flip-flop 15 causing the flip-flop 15 to present a logic 1 at its not Q terminal. The logic 1 at the not Q terminal of flip-flop 15 is applied directly to the reset terminal R of flip-flop 16 causing it to be reset.

In order that the flip-flop 13 can be quickly conditioned to again respond to the presentation of a logic 1 at its CL terminal, the reset signal from the time delay 35 must be removed by a discharge path for capacitor 37 that is separate from and faster than discharge path provided by resistor 36. A separate discharge path for capacitor 37 is provided between capacitor 37 and the Q terminal of flip-flop 13 by diode 39 and a series connected resistor 45. Since the Q terminal of flip-flop 13 presents a logic 0 signal when flip-flop 13 is reset via the time delay 35, the capacitor 37 can quickly be discharged via the diode 39 and resistor 45.

While concern was needed only for the connection of switches 2, 7, 9 and 11 with respect to the description given for illustrating the entry of the switch actuations needed per a switch code 2, 7, 9 and 11 for the operation of the flip-flop 13-16, it should be appreciated that the switches not used in a selected code are also connected in the circuitry. Connecting points are provided for the anodes of diodes 71-78, a diode for each of the switches in excess of the digits in a code specifying different switches. The cathodes of diodes 71-78 are all connected to ground via a resistor 26. The size of resistor 26 corresponds to the size of resistors 34, 44, 54, and 64. The cathodes of diodes 71-78 are all also connected to the anodes of diodes 27 and 29 which have their cathodes connected to the reset terminal R of flip-flops 13 and 16, respectively. Diode 27 also has its cathode connected to ground via a capacitor 28 in order to improve the noise immunity of the circuit. The size of capacitor 28 is much smaller than that of the capacitor 37 of the time delay circuit 35 so it is not a factor with respect to the time delay that is provided by circuit 35. When connecting the circuitry for a switching code, the switches that are not connected per a selected switching code to diodes 30, 40, 50 and 60 are connected to diodes 71-78. Actuation of a switch not connected to one of the diodes 30, 40, 50 and 60 will cause flip-flops 13 and 16 to be reset. Resetting of flip-flop 13 will in turn reset flip-flop 14 with flip-flop 15 also being reset by the resetting of the flip-flop 14. The direct resetting of flip-flop 16 in this manner is not required, but such resetting serves with the resetting of flip-flop 13 to further frustrate any attempt by an unauthorized user to actuate the various switches 1-12 in an effort to arrive at the proper coded switching input.

The circuitry described up to this point does not permit a code to be selected which requires the actuation of a given switch more than once. Additional circuitry is required to allow this to be done. Such additional circuitry includes resistor 46 which has one end connected to a terminal for each of the jumpers 33, 43, 53 and 63 with the other end of the resistor 46 connected to ground. With this arrangement, those flip-flops to be actuated by the same switch for a selected code requires that the jumper associated with the input circuit to the CL terminal of such flip-flops be connected to the resistor 46. For example, if 2256 is the selected switching code, the jumper 33 is changed from the position shown in the drawing to a position wherein the jumper 33 is connected between the input circuit to the terminal CL of flip-flop 13 and the resistor 46. In addition, the jumper 43 is similarly changed to provide a connection between the input circuit to terminal CL of flip-flop 14 and resistor 46. Switch 2 is then connected to the anode of diode 30 or to the anode of diode 40. Switch 5 is connected to the anode of diode 50 and switch 6 is connected to the anode of diode 60. The remaining switches are connected via the diode 71-78 to resistor 26 and to the reset terminal R flip-flop 13 and the reset terminal R of flip-flop 16. Since a switch that is to be actuated more than once for a preselected code is connected in a like manner to each of the CL terminals for the flip-flop circuits involved, circuitry in addition to that already discussed is required to prevent an actuation of such a connected switch from being effective to trigger more than one flip-flop simultaneously. Such additional circuitry takes the form of a time delay circuit 83 for connecting the Q terminal of flip-flop 13 to the D terminal of flip-flop 14 plus a similar time delay circuit 84 for connecting the Q terminal of flip-flop 14 to the D terminal of flip-flop 15 and a similar time delay 85 for connecting the Q terminal of flip-flop 15 to the D terminal of flip-flop 16. The time delay circuits 83, 84, and 85 can each take the form of a simple RC circuit. Referring to the time delay circuit 83, a resistor 93 is connected at one end to the Q terminal of flip-flop 13 and has its other end connected to ground via a capacitor 96. The connection common to resistor 93 and capacitor 96 is connected to the D terminal of flip-flop 14. Delay circuit 84 is similarly provided by resistor 94 and capacitor 97 with the time delay circuit 85 similarly provided by resistor 95 and capacitor 98. The delay circuits serve to delay the application of a logic 1 from the Q terminal of a flip-flop to the D terminal of the next flip-flop. A time delay on the order of 0.05 seconds for the time delay circuits 83, 84, and 85 is sufficient to prevent an actuation of the switch which is connected to the input circuits for the CL terminals of more than one flip-flop from causing more than one flip-flop to be operated by a single actuation of such switch.

The output of the last flip-flop, i.e. flip-flop 16, that is presented in response to the entry of the preselected switching code provides a control signal that is of interest for controlling the operation of another circuit or apparatus. Based on the circuitry discussed to this point, such control signal, which can be the output at the Q or the not Q terminals, will be terminated when the time delay circuit 35 has operated to initiate the series resetting of flip-flop circuits 13-16 as has been described. In order to repeat the control signal at the flip-flop 16, the circuitry that has been described requires re-entry of the preselected code switching. Such an arrangement is undesirable for a situation where the repeat of the control signal is desired in a short time, such as the time it might take to repeat the actuation of the last switch of the code. Further, it is desirable that the user not be required to accurately repeat the entry of the entire code to obtain a desired repeat of the control signal. A repeat of the control signal can be provided in the manner desired as outlined above, a reset circuit 79 for resetting the last flip-flop circuit, i.e., flip-flop 16, is provided which includes a resistor 86 and a capacitor 87. The one end of resistor 86 is connected to the Q terminal of flip-flop 16 with its other end connected to ground via the capacitor 87. The connection common to the resistor 86 and capacitor 87 is connected to the reset terminal R of the flip-flop 16 via a diode 88 which has its cathode connected to the R terminal. The charge present on capacitor 87 which provides the reset signal to flip-flop 16 is discharged when the flip-flop is reset. Rather than use resistor 86 to provide a discharge path, a separated discharge circuit, which provides for faster discharge of capacitor 87, is connected between the connection common to resistor 86 and capacitor 87 and the Q terminal of flip-flop 16. The discharge circuit includes a resistor 89 connected in series with a diode 90. The diode 90 is connected so that current can flow from the capacitor 87 to the Q terminal when the flip-flop 16 has been reset to present a logic 0 at the Q terminal. The use of the reset circuit 79 for the automatic resetting of flip-flop 16 a short time after it has been set makes it possible to omit the connection 25 between the not $\overline{Q}$ output of flip-flop 15 and the reset terminal R of flip-flop 16.

The remainder of the circuitry shown in the drawing includes the circuit elements necessary for providing a d.c. voltage across the Zener diode 19 and to allow an electrical device represented by the load 100 to be energized in response to the control signal presented at the flip-flop 16 following entry of the preselected code switching. The source of the d.c. voltage for operation of the circuitry and for providing current flow for energization of the load 100 includes a source of electrical power which can be a transformer 101 which has its primary winding connected to an AC power source 102, a full wave rectifier bridge 104, diode 105, resistor 106 and a capacitor 107. The secondary winding of transformer 101, which typically provides 6 to 24 volts A.C., is connected in series with the load 100 with such series combination connected between the input terminals 112 and 114 of the full wave rectifier 104. One of the output terminals of the full wave rectifier is connected to ground while the other output terminal is connected to the anode of diode 105 which has its cathode connected to one end of resistor 106. The other end of resistor 106 is connected to the cathode of Zener diode 19. The capacitor 107 is connected between the cathode of Zener diode 19 and ground. The resistor 106 serves as a current limiting device which in conjunction with the impedance presented by the other circuitry that has been described to this point causes only a small current level to flow through the load 100 with such current level being too low to be an actuating or energizing current for load 100. A transistor 108 is connected between the anode of diode 105 and ground to provide a switching action in response to a control signal from flip-flop 16 to cause the load 100 to pass a desired actuating or energizing current. The transistor 108 can be an NPN type transistor with its emitter connected to ground and its collector connected to the anode of diode 105. The base of transistor 108 is connected to receive a control signal from the Q terminal of flip-flop 16 via a resistor 109. Upon entry of the preselected switching code, the Q terminal of flip-flop 16 presents a logic 1 causing the transistor 108 to conduct which is effective to connect the load 100 across the secondary winding of the transformer 101 via the full wave rectifier 104 and transistor 108 so that the load 100 receives a current sufficient for its actuation or energization. The energy stored by capacitor 107 is used for the short time that the transistor 108 is turned on.

That portion of the circuitry represented by the load 100 and the electrical power source for the circuitry to which the load is connected is representative of the circuitry to which the remainder of the circuitry of the drawing is connectable at terminals 112 and 114. Circuitry presented by many automatic garage door openers provides an example of circuitry that can be connected at terminals 112 and 114. Accordingly, the circuitry, as has been described, can be used to generate a control signal at the Q terminal of flip-flop 16 which can be utilized to initiate a current flow for causing the operation of a garage door opener.

One portion of the circuitry that has not been mentioned is the diode 110 which has its cathode connected to the connection common to the diode 105 and resistor 106. The diode 110 is shown since a circuit is then provided which can be utilized for the operation of garage door openers sold under the trade name "Genie" (Alliance Manufacturing Company, Alliance, Ohio). A "Genie" garage door opener can be connected to the anode of diode 110 and to the two terminals of the full wave rectifier 104 to which the load and secondary winding of the transformer is shown connected in the circuitry of the drawing. There are garage door opener models sold under the "Genie" trade name which require the transistor 108 to be switched twice. The control circuitry that has been described can accomplish this since the output provided at the Q terminal of flip-flop 16 following entry of the preselected code switching can be repeated merely by actuating the switch for the last digit of the switching code a second time. A reset signal is provided to the flip-flop 16 from the Q terminal of flip-flop 16 before the switch for the last digit of the switching code can be actuated for the second time.

While the electrical power source connected to the load 100 is shown as a transformer 101 which is connected to an A.C. power source, the electrical power source can be a d.c. power source, such as a battery which is connected in series with the load 100.

What is claimed is:

1. Circuitry controlled by a series of switch actuations in accordance with a preselected switch code for providing a control signal including a plurality of flip-flop circuits, one for each digit of the preselected switch code, each of said flip-flop circuits having at least one output and at least two input terminals, one of said input terminals of one of said flip-flop circuits arranged for connection to a d.c. source;

means connecting said plurality of flip-flop circuits in series for series operation of said plurality of flip-flop circuits, said one flip-flop circuit connected as the first flip-flop circuit of said series, said series operation requiring the flip-flop circuit preceding a given flip-flop circuit to provide a signal from said one output of said preceding flip-flop circuit to one of said input terminals of said given flip-flop circuit to condition said given flip-fllop circuit for providing a signal at said one output of said given flip-flop circuit in response to a signal presented to the other of said input terminals of said given flip-flop circuit, said means including a time delay circuit portion for each given flip-flop circuit having a preceding flip-flop circuit, said time delay circuit portion for a given flip-flop circuit connected to said one input of the given flip-flop circuit and to said one output of the flip-flop preceding the given flip-flop circuit;

a plurality of manually operable switches actuatable in accordance with a preselected switch code, said code having a plurality of digits which are fewer in number than said switches, said plurality of switches selectably connectable to said plurality of flip-flop circuits and when actuated providing a signal useable as a signal input to the other of said input terminals of said flip-flop circuits, said plurality of switches, when connected to said flip-flop circuits and actuated in accordance with said preselected switch code, providing for said series operation of said plurality of flip-flop circuits, said last flip-flop circuit of said series when operated providing said control signal.

2. Circuitry according to claim 1 wherein each of said flip-flop circuits has a reset terminal and an additional output terminal, said circuitry further including a time delay circuit portion connected between said one output terminal of said first flip-flop circuit and said reset terminal of said first flip-flop circuit, said reset terminal of a given flip-flop circuit of the remaining flip-flop circuits connected to said additional output terminal of the flip-flop circuit preceding said given flip-flop circuit.

3. Circuitry according to claim 2 wherein said circuitry further includes a time delay circuit portion connected between said output terminal of said last flip-flop circuit of said series and said reset terminal of said last flip-flop circuit.

4. Circuitry according to claim 3 wherein said time delay circuit portion connected to said reset terminal of said first flip-flop circuit provides a time delay of a duration that is greater than the time delay provided by said time delay circuit portion connected to said reset terminal of said last flip-flop circuit.

5. Circuitry according to claim 1 wherein each of said flip-flop circuits has a reset terminal and an additional output terminal, said circuitry further including a time delay circuit portion connected between said one output terminal of said first flip-flop circuit and said reset terminal of said first flip-flop circuit, and a time delay circuit portion connected between said output terminal of said last flip-flop circuit of said series and the reset terminal of said last flip-flop circuit, said reset terminal of a given flip-flop circuit of the remaining flip-flop circuits connected to said additional output terminal of the flip-flop circuit preceding said given flip-flop circuit.

6. Circuitry according to claim 5 wherein said time delay circuit portion connected to said reset terminal of said first flip-flop circuit provides a time delay of a duration that is greater than the time delay provided by said time delay circuit portion connected to said reset terminal of said last flip-flop circuit.

7. Circuitry according to claim 1 wherein each of said flip-flop circuits has a reset terminal and an additional output terminal, said circuitry further including means connected to the reset terminal of said first flip-flop circuit and connectable to said plurality of manually operable switches, said reset terminal of a given flip-flop circuit of the remaining flip-flop circuits connected to said additional output terminal of the flip-flop circuit preceding said given flip-flop circuit whereby actuation of a switch of said plurality of switches when connected to said last-mentioned means causes flip-flop circuits to be reset in series sequence beginning with said first flip-flop circuit.

8. Circuitry according to claim 5 wherein said time delay circuit portion connected between said one output terminal of said first flip-flop circuit and said reset terminal of said flip-flop circuit includes a capacitor and a discharge circuit for said capacitor connected between said capacitor and said one output of said first flip-flop circuit.

9. Circuitry according to claim 5 wherein said time delay circuit portion connected between said output terminal of said last flip-flop circuit and the reset terminal of said last flip-flop circuit includes a capacitor and a discharge circuit for said capacitor connected between said capacitor and said one output of said last flip-flop circuit.

* * * * *

UNITED STATES PATENT AND TRADEMARK OFFICE

CERTIFICATE OF CORRECTION

PATENT NO. : 4,417,247

DATED : November 22, 1983

INVENTOR(S) : DARYL D. DRESSLER

It is certified that error appears in the above—identified patent and that said Letters Patent is hereby corrected as shown below:

Column 3, line 20, "flop" (first occurrence) should read -- flops --.

Column 10, line 3, before "output" insert -- one --.

Signed and Sealed this

*Seventh* Day of *February 1984*

[SEAL]

*Attest:*

GERALD J. MOSSINGHOFF

*Attesting Officer* *Commissioner of Patents and Trademarks*